(12) United States Patent
Clark et al.

(10) Patent No.: US 8,701,101 B2
(45) Date of Patent: Apr. 15, 2014

(54) SYSTEM AND METHOD FOR MANAGING UPGRADES FOR A PORTABLE ELECTRONIC DEVICE

(75) Inventors: David Clark, Kitchener (CA); Herbert Little, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1722 days.

(21) Appl. No.: 11/693,768

(22) Filed: Mar. 30, 2007

(65) Prior Publication Data

US 2008/0243525 A1 Oct. 2, 2008

(51) Int. Cl.
G06F 9/44 (2006.01)

(52) U.S. Cl.
USPC .......................................... 717/171; 717/168

(58) Field of Classification Search
USPC .................................. 717/168–178
See application file for complete search history.

(56) References Cited

U.S. PATENT DOCUMENTS

| 6,199,204 | B1 * | 3/2001 | Donohue | 717/178 |
| 6,202,207 | B1 * | 3/2001 | Donohue | 717/173 |
| 6,775,536 | B1 | 8/2004 | Geiger et al. | |
| 7,748,000 | B2 * | 6/2010 | Genty et al. | 717/176 |
| 7,783,729 | B1 * | 8/2010 | Macaluso | 709/220 |
| 2002/0131404 | A1 | 9/2002 | Mehta et al. | |
| 2005/0229171 | A1 * | 10/2005 | Henry et al. | 717/168 |
| 2005/0229173 | A1 * | 10/2005 | Mihm et al. | 717/171 |
| 2006/0147043 | A1 * | 7/2006 | Mann et al. | 380/270 |
| 2007/0169087 | A1 * | 7/2007 | Fadell | 717/168 |
| 2008/0028389 | A1 * | 1/2008 | Genty et al. | 717/174 |

FOREIGN PATENT DOCUMENTS

| CN | 1613040 A | 5/2005 |
| EP | 1465039 | 10/2004 |
| EP | 1465039 A | 10/2004 |
| EP | 1569410 A | 8/2005 |
| WO | 0133867 A | 5/2001 |
| WO | 0133867 A2 | 5/2001 |

* cited by examiner

Primary Examiner — Qing Chen
(74) Attorney, Agent, or Firm — Perry + Currier Inc.

(57) ABSTRACT

A system and method for management of a portable electronic device is provided. An embodiment includes a system that comprises a portable electronic device that is wirelessly connectable to a carrier administrative server and an enterprise administrative server. The portable electronic device maintains a policy that defines how upgrade requests are to be managed. The policy can define, for example, whether or not the carrier administrative server is permitted to instruct the portable electronic device to install upgrades.

20 Claims, 7 Drawing Sheets

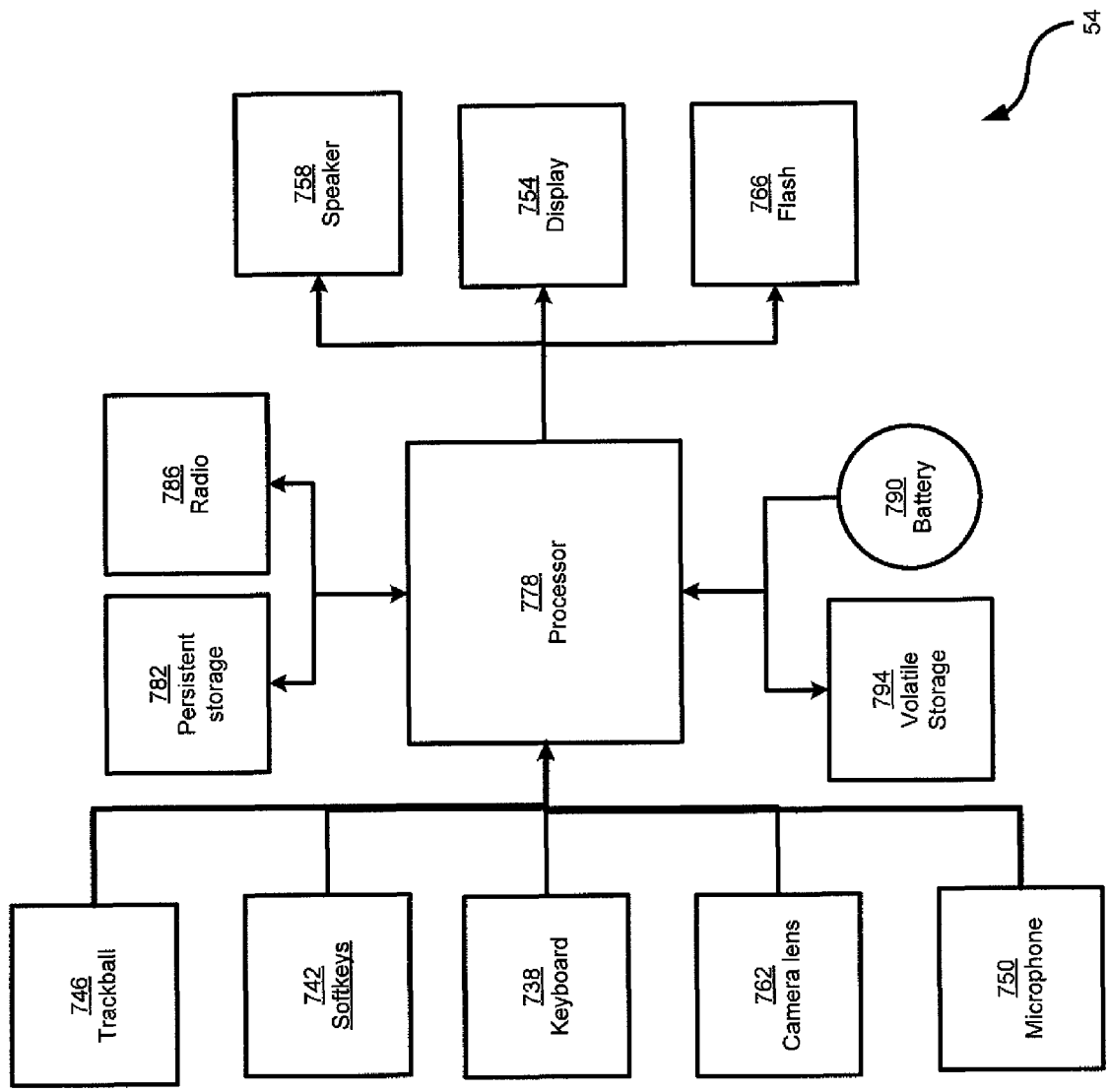

SYSTEM AND METHOD FOR MANAGING UPGRADES FOR A PORTABLE ELECTRONIC DEVICE

FIELD

The present disclosure relates generally to telecommunications and more particularly relates to a system and method for management of a portable electronic device.

BACKGROUND

Computing technology and networking technology have combined to produce extremely power means for telecommunication. However, further advances are to be expected and welcomed.

Portable electronic devices are now commonplace and increasing in sophistication and function. Portable electronic devices frequently combine the functionality of traditional cellular telephones, wireless personal digital assistants, handheld computers, wireless paging devices, media players, cameras and the like.

As portable electronic devices incorporate more powerful hardware, it is becoming possible to drastically increase functionality by simply installing upgrades to the computer's software and/or firmware. Since most portable electronic devices are also wirelessly networked, such upgrades can be effected over those wireless interfaces.

Portable electronic devices are also used as enterprise tools, whereby a business will provide portable electronic devices to each of its employees in order to allow those employees to communicate via the text and voice services offered by the portable electronic device. In the enterprise context, the information technology group of the enterprise will often be responsible for maintaining and servicing the portable electronic devices. Such maintenance and servicing functions will usually include the management of upgrades.

However, the wireless carrier to which the enterprise subscribes will also have the capacity to offer maintenance and service for the portable electronic devices, including the management of upgrades. Unfortunately the carrier's maintenance and service program may conflict with the enterprises' maintenance and service program, creating problems for the enterprise.

BRIEF DESCRIPTION OF THE DRAWINGS

FIG. 7 shows an exemplary block diagram hardware configuration for the PED in FIG. 1.

DETAILED DESCRIPTION

Figure 1:
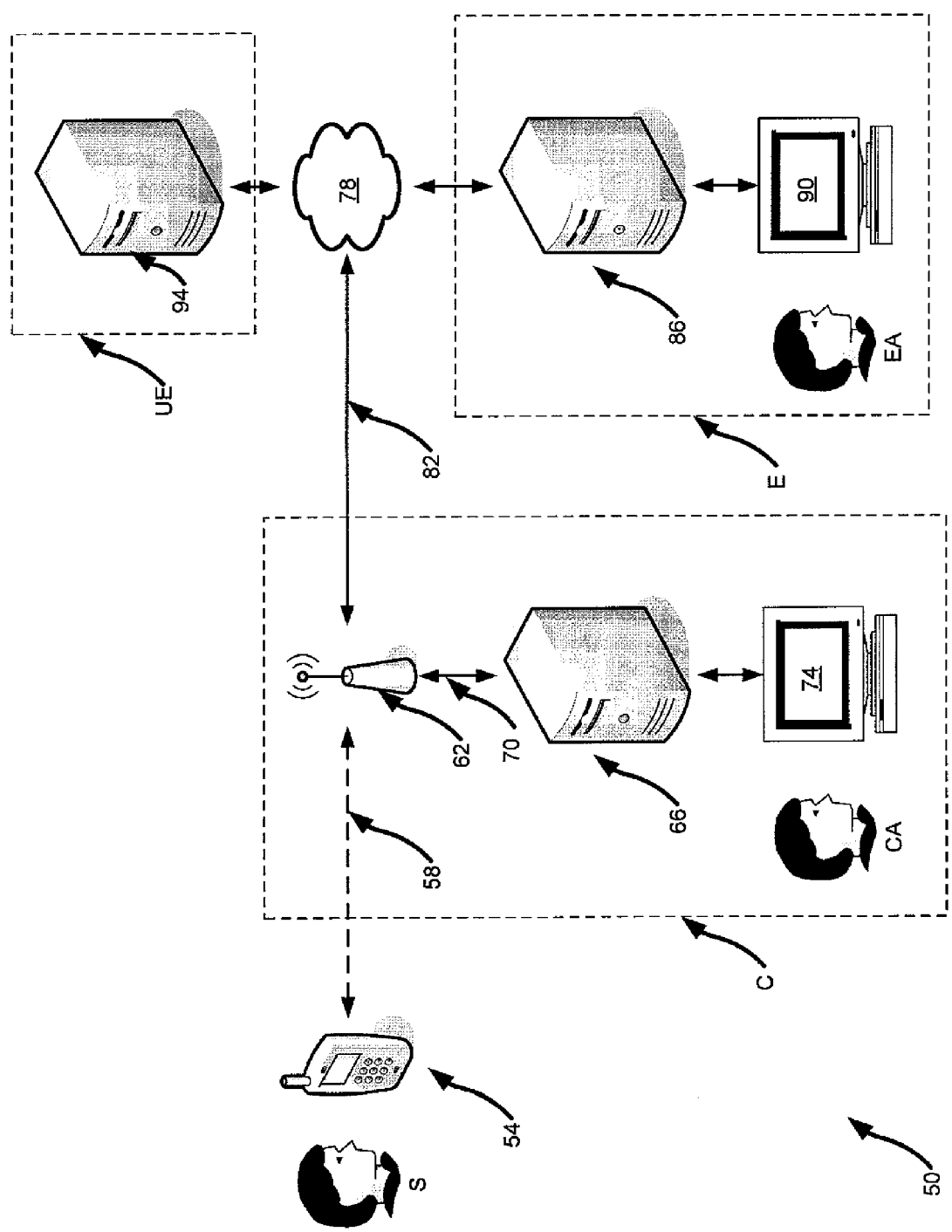
FIG. 1 show a schematic representation of a system for management of a portable electronic device.

An aspect of this disclosure provides a portable electronic device ("PED") comprising a microcomputer comprising a processor and a persistent storage device. The persistent storage device is configured to maintain a policy and the processor configured to manage upgrade requests according to the policy. The PED also comprises a communication interface for connecting the microcomputer to a carrier administrator server via a telecommunication link. The carrier administrative server is configured to respond to upgrade requests if the requests are permitted by the policy.

The policy can define whether the carrier administrative server is permitted to instruct the microcomputer to install upgrades.

The policy can define whether the portable electronic device is permitted to request whether or not upgrades are available for the portable electronic device.

The policy can define whether the portable electronic device is permitted to request upgrades to the microcomputer from the carrier administrative server.

The communication interface can be further configured to communicate with an enterprise administrative server connected to the portable electronic device via the telecommunication link. The enterprise administrative server can be configured to define the policy.

The policy can define whether the enterprise administrative server is permitted to instruct the microcomputer to install upgrades. The policy can further define whether the portable electronic device is permitted to request whether or not upgrades are available for the portable electronic device.

The policy can define whether the portable electronic device is permitted to request upgrades to the microcomputer from the enterprise administrative server.

The upgrade can be at least one of: a new software application, a new firmware application, an operating system upgrade, a software application upgrade, and a data file.

Another aspect of the disclosure provides a method of managing upgrades to a portable electronic device comprising:

receiving an upgrade request;
determining whether the upgrade request complies with an upgrade policy;
denying the request if the upgrade request does not comply with the upgrade policy; and,
completing the request if the upgrade request does comply with the upgrade policy.

The policy can be maintained on the portable electronic device, or it can be maintained on a computing device separate from the portable electronic device.

Another aspect of the disclosure provides a computer readable medium for storing a plurality of programming instructions that readable and executable on a portable electronic device; the programming instructions implementing a method of managing upgrades for the portable electronic device; the method comprising:

receiving an upgrade request;
determining whether the upgrade request complies with an upgrade policy;
denying the request if the upgrade request does not comply with the upgrade policy; and,
completing the request if the upgrade request does comply with the upgrade policy.

Another aspect of the disclosure provides a system for management of a portable electronic device comprising:

a portable electronic device associated with a carrier and an enterprise;
a carrier administrative server connected to the portable electronic device via a telecommunication link; the carrier administrative server configured to respond to an upgrade request according to a policy; and, an enterprise administrative server connected to the portable electronic device and carrier administrative server via the telecommunication link configured to define the policy; the policy indicating whether the carrier administrative server is permitted to respond to the upgrade request.

Another aspect of the disclosure provides a carrier administrative server for use in a system for management of a portable electronic device, where the system comprises a portable electronic device associated with a carrier. The system also comprises an enterprise administrative server connected to the portable electronic device via a telecommunication link. The enterprise administrative server is configured to define a policy indicating permissions to respond to an upgrade request. The carrier administrative server comprises an interface for connecting via the telecommunication link to the portable electronic device and the enterprise administrative server. The carrier administrative server also comprises a processor configured to respond to an upgrade request for the portable electronic device according to the policy.

Referring now to FIG. 1, a system for management of a portable electronic device is indicated generally at 50. System 50 comprises at least one portable electronic device ("PED") 54 that is operated by a subscriber S. PED 54 has a wireless interface and is therefore able to communicate via a wireless link 58. Link 58 can be based on any known type of wireless access link, or cominations thereof, including, by way of non-limiting example, Code Division Multiple Access ("CDMA"), the Global System for Mobile communications ("GSM"), WiMax, 802.11 g and its variants, Bluetooth and the like. Indeed, the set of links interconnecting the various components need not be particularly limited.

At the end of link 58 opposite to PED 54 is a wireless base station 62 that is operated by a carrier C. Carrier C also operates at least one carrier administrative server 66 that connects to base station 62 via a backhaul 70. A terminal 74 is connected to server 66 in order to allow a carrier administrator CA to interact with server 66. Carrier C is typically the carrier with whom subscriber S directly contracts for wireless services, as opposed to a roaming carrier that has infrastructure that subscriber S can utilize due to a relationship between carrier C and that roaming carrier.

Base station 66 is also connected to a network 78, such as the Internet, via a backhaul 82. In turn, an enterprise administrative server 86 that is operated by an enterprise E is connected to network 78. A terminal 90 is connected to server 86 in order to allow an enterprise administrator EA to interact with server 86. In the present embodiment, PED 54 is associated with enterprise E in such a manner that enterprise administrative server 86 is configured to perform administrative functions on behalf of PED 54.

Likewise, an upgrade server 94, operated by an upgrade entity UE, is also connected to network 78. Upgrade server 94 is configured to host upgrades that may be available for PED 54. As used herein, the term "upgrade" refers to any type of new and/or different software and/or firmware that can be installed on a portable electronic device. For example, assume PED 54 is using version 1.0 of an operating system that is configured for the hardware of PED 54. Also assume that version 1.1 of that operating system has been released. In this example, upgrade server 94 can host version 1.1 for download to PED 54, subject to the other operational conditions of system 50 which will be explained further herein. In this example, upgrade entity UE can be the same entity that originally manufactured and/or designed PED 54. It should also be clear that an upgrade can refer to a new software or firmware object (e.g. application, firmware, data file) altogether, and need not be limited to replacing existing software objects with more recent one.

Carrier administrative server 66 is configured to perform a variety of device management and administrative functions on behalf of carrier C in relation to PED 54. At least one of those administrative functions includes the management of upgrades to PED 54. More 1specifically, carrier administrator CA using terminal 74 can interact with server 66, to become aware of upgrades for PED 74 that are available from server 94. Having become aware of such upgrades, and subject to the other conditions of system 50 which will be discussed further below, carrier administrator CA can elect to make upgrades on server 94 available to subscriber S for download and installation onto PED 54. Also subject to the other conditions of system 50, server 66 can be configured to be responsive to queries from PED 54 as to whether upgrades are available. Also subject to the other conditions of system 50, server 66 can be configured to instruct PED 54 to install upgrades, forcing them to be installed on PED 54, and/or to only install upgrades subject to explicit requests for upgrade installation on PED 54.

Enterprise administrative server 86 is also configured to perform a variety of device management and administrative functions on behalf of carrier C in relation to PED 54. One or more of those functions can overlap with the functions of carrier administrative server 66. Typically, however, at least some of the functions in carrier administrative server 66 and enterprise administrative server 86 are different. However, at least one of the administrative functions of server 86 also includes the management of upgrades to PED 54. More specifically, enterprise administrator EA using terminal 90 can interact with server 86, to become aware of upgrades for PED 74 that are available from server 94. Having become aware of such upgrades, and subject to the other conditions of system 50 which will be discussed further below, enterprise administrator CA can elect to make upgrades on server 94 available to subscriber S for download and installation onto PED 54. Also subject to the other conditions of system 50, server 86 can be configured to be responsive to queries from PED 54 as to whether upgrades are available. Also subject to the other conditions of system 50, server 86 can be configured to instruct PED 54 to install upgrades, forcing them to be installed on PED 54, and/or to only install upgrades subject to explicit requests for upgrade installation on PED 54. Also subject to the other conditions of system 50, server 86 can be configured to completely or partially override and or otherwise control the ability for server 66 to perform upgrade functions for PED 54 as previously described in relation to carrier administrative server 66.

Those skilled in the art will now recognize that system 50 can have applicability to PEDs such as the Blackberry™ line of PEDs from Research In Motion Inc. of Waterloo, Ontario Canada. For example, where PED 54 is a Blackberry™, then server 86 can be a Blackberry Enterprise Server ("BES") from Research In Motion Inc. that is operated by (or available to and used by) enterprise E. In this example, subscriber S may be an employee of enterprise E. Likewise, upgrade entity UE itself can be Research in Motion Inc., and upgrade server 94 can be a server operated by Research In Motion Inc. Likewise, carrier C can be any wireless carrier, (e.g. Verizon, AT&T, Sprint, Orange) and server 66 can be any type of Operations, Administration, Maintenance, and Provisioning ("OAMP") that is operated by (or available to and used by) a carrier C. However, the teachings herein are not limited to Blackberry™ implementations and can also be applicable to other systems that bear the same basic structure as system 50, such as, by way of non-limiting example those systems offered by Motorola Good Technology Group 4250 Burton Drive, Santa Clara, Calif. 95054.

Figure 2:
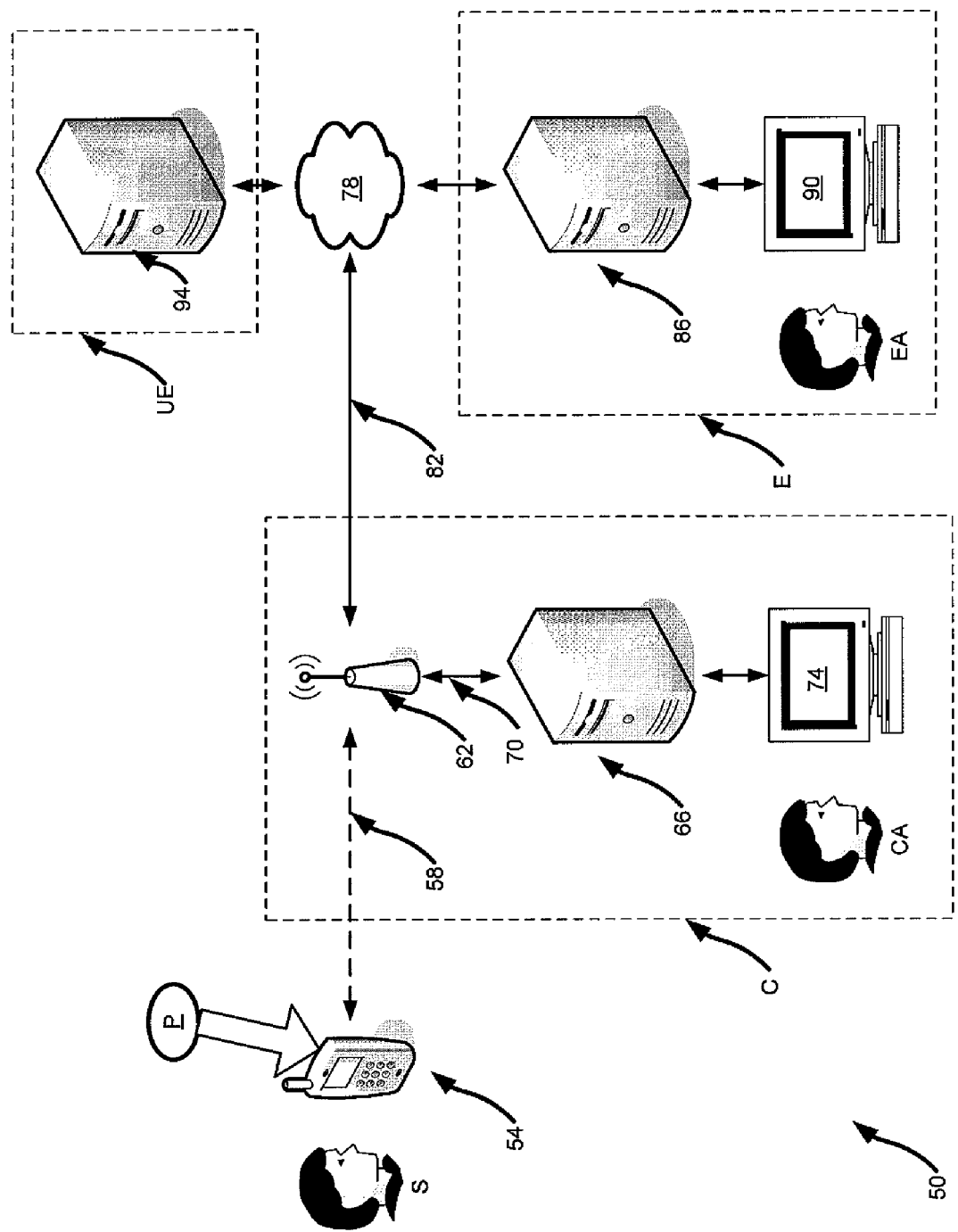
FIG. 2 shows the system of FIG. 1 according to a specific implementation.

In a specific embodiment, shown in FIG. 2, PED 54 maintains a policy P which is stored in a storage device within PED 54. FIG. 2 is exemplary because the actual location of storage of policy P can be varied. Such a persistent storage device can be based on any hardware storage technology, such as Electrically Erasable Programmable Read Only Memory ("EEPROM") or flash memory or the like. Policy P can include any number of rights, privileges, security controls and the like. In a present embodiment, policy P includes at least the privileges associated with how upgrades are made available and/or delivered to PED 54. Table I shows a purely exemplary set of fields that can be used to implement policy P

TABLE I

Exemplary structure and contents of Policy P

| Field Number | Field Description | Exemplary Field Contents |
|---|---|---|
| 1 | Can Carrier instruct PED to install upgrades? | No |
| 2 | Can Enterprise instruct PED to install upgrades? | Yes |
| 3 | Can Subscriber query Carrier as to whether upgrades are available? | No |
| 4 | Can Subscriber "Request" upgrades from Carrier? | No |
| 5 | Can Subscriber query Enterprise as to whether upgrades are available? | Yes |
| 6 | Can Subscriber "Request" upgrades from Enterprise? | Yes |

Explaining Table I in greater detail, Field 1 can be set to "Yes" or "No" to indicate whether carrier C can use server 66 to instruct PED 54 to install upgrades available on server 94, and thereby automatically force PED 54 to install and begin operating using that upgrade. Field 2 can be set to "Yes" or "No" to indicate whether enterprise E can use server 86 to instruct PED 54 to install upgrades available on server 94, and thereby automatically force PED 54 to install and begin operating using that upgrade. Field 3 can be set to "Yes" or "No" to indicate whether subscriber S can use PED 54 to send a query to server 66 as to whether any upgrades available on server 94 are available. Field 4 can be set to "Yes" or "No" to indicate whether subscriber S can use PED 54 to actually request a download of an available upgrade of an upgrade from carrier C via server 66. Field 5 can be set to "Yes" or "No" to indicate whether subscriber S can use PED 54 to send a query to server 86 as to whether any upgrades available on server 94 are available. Field 6 can be set to "Yes" or "No" to indicate whether subscriber S can use PED 54 to actually request a download of an available upgrade of an upgrade from carrier C via server 86.

Figure 3:
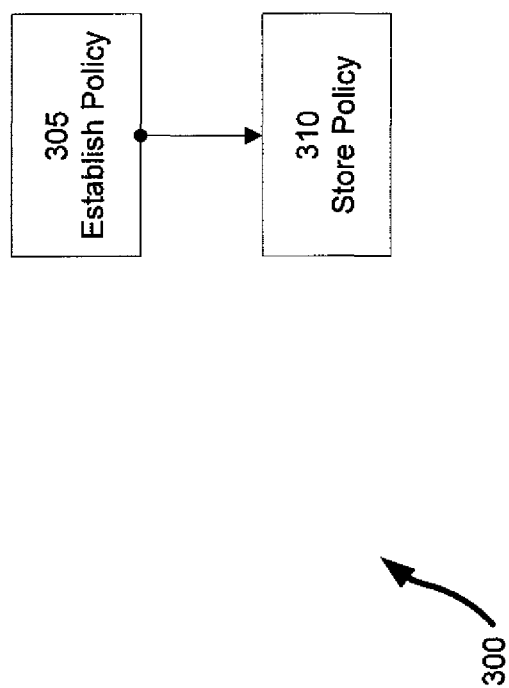
FIG. 3 shows a flowchart depicting a method of managing a PED in accordance with another embodiment.
Figure 4:
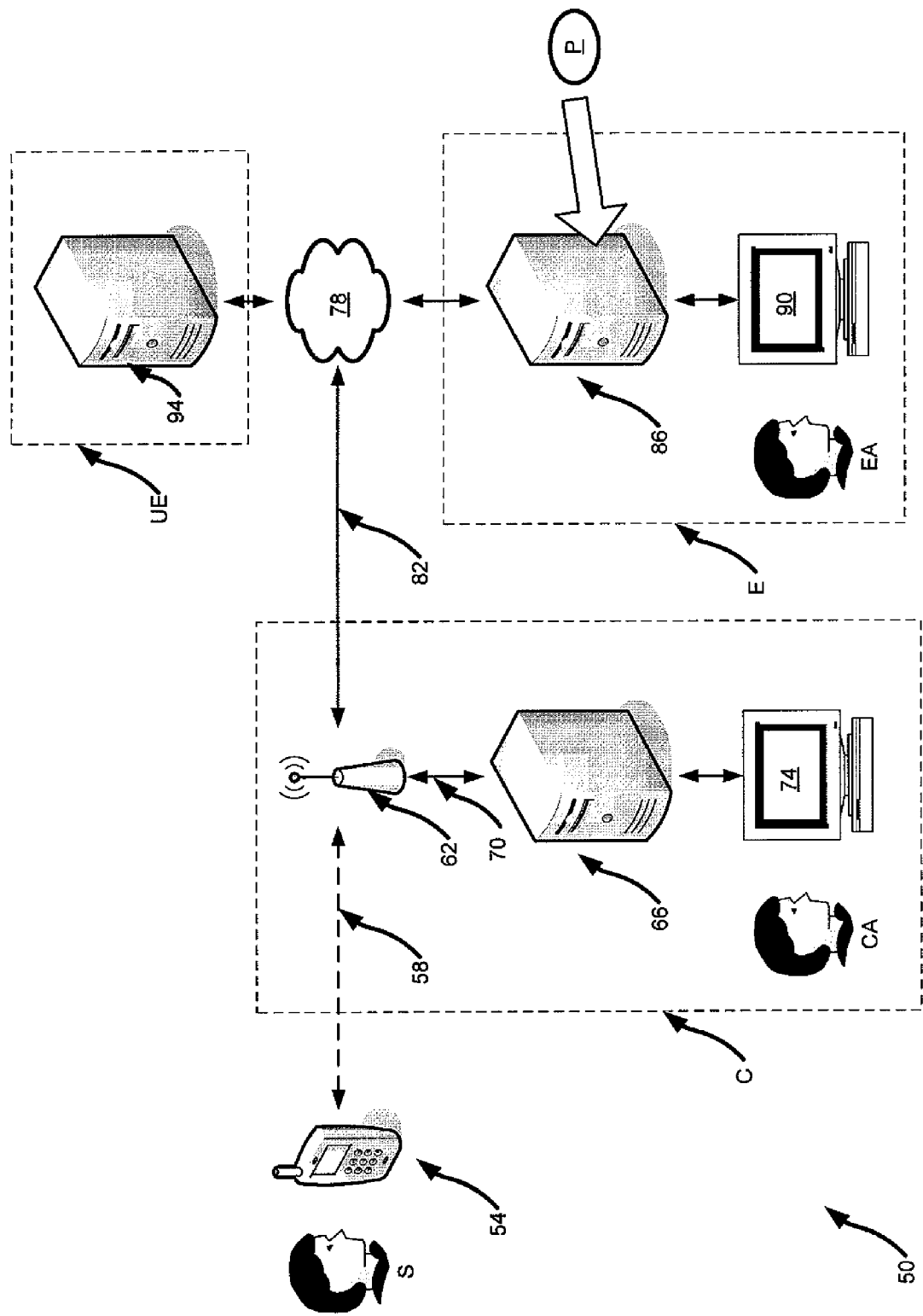
FIG. 4 shows the system of FIG. 2 during exemplary performance of the method of FIG. 3.

Referring now to FIG. 3, a method for managing a portable electronic device is depicted in the form of a flow chart and indicated generally at 300. For the purposes of helping to further explain system 50 and method 300, method 300 will be explained in terms of its performance on system 50. It should be understood however, that system 50 and method 300 can be varied and that method 300 can be performed on different configurations of systems. Beginning first at step 305, a policy is established. Exemplary performance of step 305 is represented in FIG. 4, whereby enterprise administrator EA will use appropriate user-interfaces on terminal 90 to interact with server 86 so as to define policy P As previously mentioned, policy P can have different structures, but in the present example it will be assumed that policy P is configured according to Table I.

Figure 5:
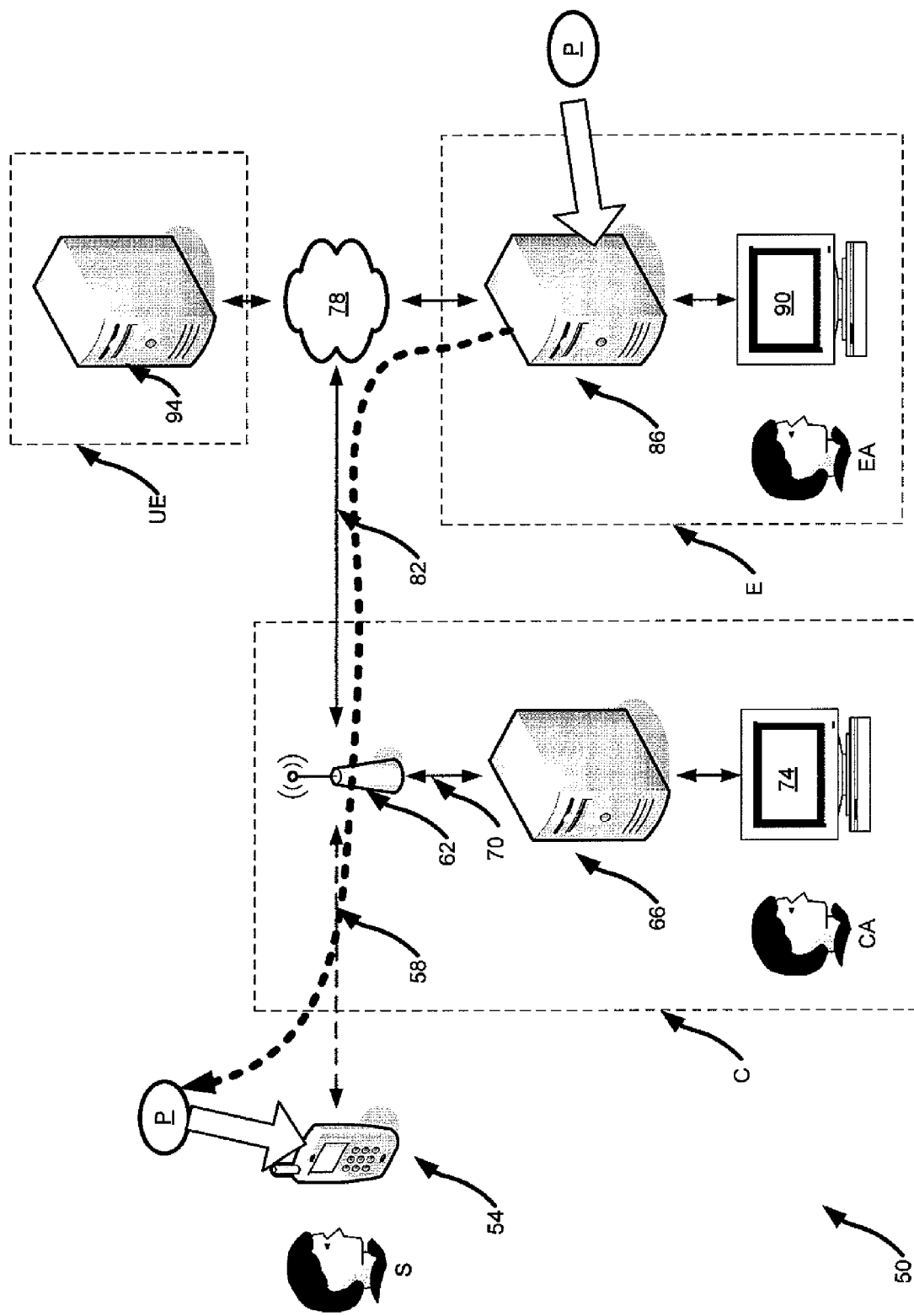
FIG. 5 shows the system of FIG. 2 during exemplary performance of the method of FIG. 3.

Next, at step 310, the policy is stored. Exemplary performance of step 310 is represented in FIG. 5, whereby enterprise administrator EA will use appropriate user-interfaces on terminal 90 to then cause policy P, as defined at step 305, to be carried via network 78 and base station 62 for storage on PED 54.

Figure 6:
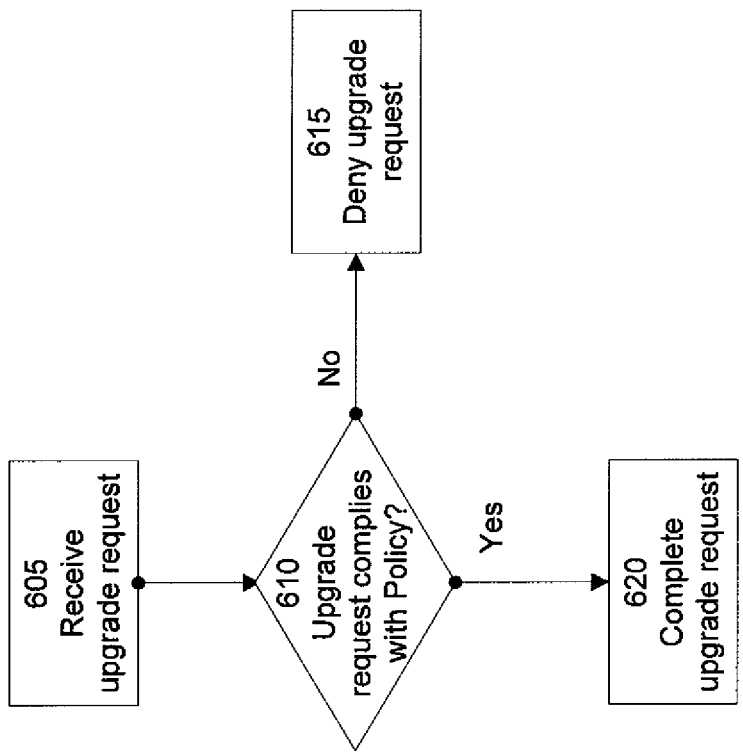
FIG. 6 shows a flowchart depicting a method of managing a PED in accordance with another embodiment.

Referring now to FIG. 6, another method for managing a portable electronic device is depicted in the form of a flow chart and indicated generally at 600. For the purposes of helping to further explain system 50 and method 600, method 600 will be explained in terms of its performance on system 50. It should be understood however, that system 50 and method 600 can be varied and that method 600 can be performed on different configurations of systems. Method 600 can be performed in various ways and different exemplary performances of method 600 will now be provided to illustrate certain of those way.

As a first example, beginning first at step 605, an upgrade request is received. As an example of performance of step 605, assume subscriber S requests that the carrier C provide information as to whether upgrades are available. At step 610, a determination is made as to whether the request complies with the policy. Since Field 3 of Table I indicates, according to policy P, that subscriber S is not permitted to make such a request, then method 600 will advance to step 615 and the request will be denied—PED 54 will simply refuse the request and so indicate to subscriber S that such a request is not permitted.

As another example of performance of method 600, assume at step 605 that subscriber S requests that the enterprise E provide information as to whether any upgrades are available. At step 610, a determination is made as to whether the request complies with the policy. Since Field 5 of Table I indicates, according to policy P, that subscriber S is permitted to make such a request, then method 600 will advance to step 620 and the request will be processed—PED 54 will send a query server 86 via base station 62 and network 78 querying as to whether any upgrades for PED 54 are available. In turn, server 86 will reply to PED 54 with a response indicating whether any upgrades are available.

As another example of performance of method 600, assume at step 605 that carrier administrator CA instructs PED 54 to install an upgrade available on server 94. At step 610, a determination is made as to whether the request complies with the policy. Since Field 1 of Table I indicates, according to policy P, that carrier C is NOT permitted to make such a request, then method 600 will advance to step 620 and the request will be denied—PED 54 will send a response back to server 66 that such an upgrade is not permitted and PED 54 will decline to actually install the upgrade.

As another example of performance of method 600, assume at step 605 that enterprise administrator EA instructs PED 54 to install an upgrade available on server 94. At step 610, a determination is made as to whether the request complies with the policy. Since Field 2 of Table I indicates, according to policy P, that enterprise E is permitted to make such a request, then method 600 will advance to step 620 and the request will be processed—PED 54 will receive any data files that contain the upgrade and proceed to install those upgrades on PED 54.

It will now be apparent to those of skill in the art that method 600 can perform in a number of different ways according to the structure of policy P and the actual types of requests that are made, be they from subscriber S or from carrier administrator CA or from enterprise administrator EA or elsewhere.

It should be reemphasized that the structure and features of PED 54 can vary. However, to provide an example, FIG. 7 shows a block diagram representing exemplary components of PED 54 is shown. PED 54 thus includes a processor 778 which interconnects input devices of PED 54 (e.g. a trackball 746, soft keys 742, keyboard 738, a camera lens 762 and a microphone 750) and output devices of PED 54 (e.g. a speaker 758, a display 754 and a camera flash 766). Processor 778 is also connected to a persistent storage device 782. As discussed earlier, persistent storage device 782 can be implemented using flash memory or the like, and/or can include other programmable read only memory ("PROM") technology and/or can include read only memory ("ROM") technology and/or can include a removable "smart card" and/or can comprised combinations of the foregoing. Collectively, one can view processor 778 and persistent storage device 782 as a microcomputer.

PED 754 also includes a wireless radio 786 disposed that connects wirelessly to base station 62 to provide wireless email, telephony and web-browsing functionality of PED 54. PED 54 also includes a battery 790 which is typically rechargeable and provides power to the components of PED 54. In FIG. 7, for simplicity battery 90 is only shown connected to processor 78, but it will be understood that battery 790 is connected to any component (e.g. the CCD associated lens 762, radio 788, display 754 and flash 766) within PED 54 that needs power to operate. PED 54 also includes volatile storage 794, which can be implemented as random access memory ("RAM"), which can be used to temporarily store applications and data as they are being used by processor 778.

While the foregoing describes certain exemplary embodiments, it should be understood that combinations, variations and subsets of those embodiments are contemplated. For example, it should be understood that system 50 is presented in a simplified manner and that other components can be included and/or system 50 can be varied. For example, network 50 can also include the public switched telephone network ("PSTN") and/or other type of network. Also, it should be understood that backhaul 82 and backhaul 70 can in fact be the same backhaul, and are presented separately in FIG. 1 to assist in explanation. Also, in a present embodiment, upgrade entity UE, carrier C and enterprise E are all separate entities, but in other embodiments one or more of these entities can be combined. For example, the upgrade server 94 can be operated by either carrier C or enterprise E. Other variations to system 50, and/or components that can be included in system 50, will now occur to those of skill in the art.

As another example, upgrade entity UE can be an entity other than the manufacturer or designer of device 54. For example, assume PED 54 is using version 2.0 of a mapping program (e.g. Google Maps from Google Inc., 1600 Amphitheatre Parkway, Mountain View, Calif. 94043) that can download mapping information from network 78 and is configured for the hardware of PED 54. Also assume that version 2.1 of that mapping program has been released. In this example, upgrade server 94 can host version 2.1 of that mapping program for download to PED 54, subject to the other operational conditions of system 50 explained herein. In this example, upgrade entity UE can be the same entity that originally released version 2.0 of the mapping program.

As another example, it should be understood that in a typical installation multiple PEDs 54 would be included and be administered according to their own policy P, or according to a group policy P that is defined for every PED 54 associated with a given enterprise E.

As another example, enterprise E can be an entity other than an enterprise that employs or is otherwise affiliated with subscriber S. For example, enterprise E could be an entity that hosts data on behalf of an application that is executed on PED 54. Enterprise E could in turn, then need to control the exact version of an operating system or library or the like being stored on PED 54 in order to ensure the application stored on PED 54 could properly access the data stored at the enterprise E. In this situation, policy P could be used to enforce those needs of enterprise E.

As another example, it should be understood that plurality of policies P can be stored on PED 54, and such policies P could belong to a plurality of different enterprises E. In this example, it would be desirable to have a master policy that ensured that the individual policies P did not conflict with each other.

As a further example, it can be desired to have security mechanisms, such as digital signatures, to ensure that a particular policy P is authorized by, for example, a given enterprise E.

The invention claimed is:

1. A portable electronic device comprising:
a microcomputer comprising a processor; and
a communication interface configured to connect said microcomputer to an enterprise administrative server and a carrier administrative server via a telecommunication link, wherein said enterprise administrative server and said carrier administrative server are separate servers, wherein said enterprise administrative server is operated by an enterprise and connected to an enterprise administrator terminal for controlling upgrade policy of said portable electronic device, and wherein said carrier administrative server is located at a carrier that provides wireless service to said portable electronic device;
said processor of said microcomputer configured to receive an upgrade policy from said enterprise administrative server through said communication interface;
said processor of said microcomputer configured to receive a software upgrade request;
said processor of said microcomputer configured to determine whether said received software upgrade request complies with said received upgrade policy;
said processor of said microcomputer configured to deny said received software upgrade request if said received software upgrade request does not comply with said received upgrade policy; and
said processor of said microcomputer configured to communicate with said carrier administrative server through said communication interface to complete said received software upgrade request if said received software upgrade request does comply with said received upgrade policy.

2. The portable electronic device of claim 1 wherein said received upgrade policy defines whether said carrier administrative server is permitted to instruct said microcomputer to install a software upgrade received from said received software upgrade request.

3. The portable electronic device of claim 1 wherein said received upgrade policy defines whether said portable electronic device is permitted to request whether or not a software upgrade is available for said portable electronic device.

4. The portable electronic device of claim 1 wherein said received upgrade policy defines whether said portable electronic device is permitted to request a software upgrade to said microcomputer from said carrier administrative server.

5. The portable electronic device of claim 1 wherein said received upgrade policy defines whether said enterprise administrative server is permitted to instruct said microcomputer to install a software upgrade.

6. The portable electronic device of claim 1 wherein said received upgrade policy defines whether said portable electronic device is permitted to request a software upgrade to said microcomputer from said enterprise administrative server.

7. The portable electronic device of claim 1 wherein a software upgrade according to said received software upgrade request is at least one of: a new software application, a new firmware application, an operating system upgrade, a software application upgrade, and a data file.

8. A method for managing upgrades for a portable electronic device comprising a processor, said method comprising:
receiving, at said processor of said portable electronic device, an upgrade policy from an enterprise administrative server;
receiving, at said processor of said portable electronic device, a software upgrade request;
determining, by said processor of said portable electronic device, whether said received software upgrade request complies with said received upgrade policy, wherein said received upgrade policy is defined by said enterprise administrative server connectable to said portable electronic device, and wherein said enterprise administrative server is operated by an enterprise and connected to an enterprise administrator terminal for controlling upgrade policy of said portable electronic device;
denying, by said processor of said portable electronic device, said received software upgrade request if said received software upgrade request does not comply with said received upgrade policy; and
completing, by said processor of said portable electronic device, said received software upgrade request via a carrier administrative server if said received software upgrade request does comply with said received upgrade policy, wherein said enterprise administrative server and said carrier administrative server are separate servers, and wherein said carrier administrative server is located at a carrier that provides wireless service to said portable electronic device.

9. The method of claim 8 wherein said received upgrade policy is maintained on said portable electronic device.

10. The method of claim 8 wherein said received upgrade policy defines whether said carrier administrative server is permitted to instruct said portable electronic device to install a software upgrade.

11. The method of claim 8 wherein said received upgrade policy defines whether said portable electronic device is permitted to request whether or not a software upgrade is available for said portable electronic device.

12. The method of claim 8 wherein said received upgrade policy defines whether said portable electronic device is permitted to request a software upgrade to said portable electronic device.

13. The method of claim 8 wherein said received upgrade policy defines whether said enterprise administrative server is permitted to instruct said portable electronic device to install a software upgrade.

14. The method of claim 8 wherein said received upgrade policy defines whether said portable electronic device is permitted to request whether or not a software upgrade is available for said portable electronic device.

15. The method of claim 8 wherein said received upgrade policy defines whether said portable electronic device is permitted to request a software upgrade to said portable electronic device from said enterprise administrative server.

16. The method of claim 8 wherein a software upgrade according to said received software upgrade request is at least one of: a new software application, a new firmware application, an operating system upgrade, a software application upgrade, and a data file.

17. The method of claim 8 further comprising verifying that a digital certificate associated with said received upgrade policy was issued by said enterprise administrative server.

18. A non-transitory computer readable medium for storing a plurality of programming instructions that are readable and executable on a portable electronic device; said plurality of programming instructions implementing a method for managing upgrades for said portable electronic device, said method comprising:
receiving an upgrade policy from an enterprise administrative server;
receiving a software upgrade request;
determining whether said received software upgrade request complies with said received upgrade policy, wherein said received upgrade policy is defined by said enterprise administrative server connectable to said portable electronic device, and wherein said enterprise administrative server is operated by an enterprise and connected to an enterprise administrator terminal for controlling upgrade policy of said portable electronic device;
denying said received software upgrade request if said received software upgrade request does not comply with said received upgrade policy; and
completing said received software upgrade request via a carrier administrative server if said received software upgrade request does comply with said received upgrade policy, wherein said enterprise administrative server and said carrier administrative server are separate servers, and wherein said carrier administrative server is located at a carrier that provides wireless service to said portable electronic device.

19. A system for managing upgrades for a portable electronic device, said system comprising:
a portable electronic device, comprising a processor, associated with a carrier and an enterprise;
a carrier administrative server connected to said portable electronic device via a telecommunication link, wherein said carrier administrative server is located at a carrier that provides wireless service to said portable electronic device, and wherein said carrier administrative server is configured to complete a software upgrade request for said portable electronic device according to an upgrade policy if said software upgrade request complies with said upgrade policy, unless said software upgrade request has been denied by said portable electronic device for not complying with said upgrade policy; and
an enterprise administrative server connected to said portable electronic device and said carrier administrative server via said telecommunication link and configured to define said upgrade policy, wherein said enterprise administrative server and said carrier administrative server are separate servers, wherein said enterprise administrative server is operated by an enterprise and connected to an enterprise administrator terminal for controlling upgrade policy of said portable electronic device, and wherein said upgrade policy indicates permissions on whether said carrier administrative server is permitted to respond to said software upgrade request.

20. A carrier administrative server for use in a system for managing upgrades for a portable electronic device, said system comprising:

a portable electronic device, comprising a processor, associated with a carrier that provides wireless service to said portable electronic device; and an enterprise administrative server connected to said portable electronic device via a telecommunication link, wherein said enterprise administrative server and said carrier administrative server are separate servers, wherein said enterprise administrative server is operated by an enterprise and connected to an enterprise administrator terminal for controlling upgrade policy of said portable electronic device, wherein said enterprise administrative server is configured to define an upgrade policy indicating permissions on whether said carrier administrative server is permitted to respond to a software upgrade request, and wherein said carrier administrative server comprises:

a communication interface configured to connect via said telecommunication link to said portable electronic device and said enterprise administrative server; and a processor configured to complete said software upgrade request for said portable electronic device according to said upgrade policy if said software upgrade request complies with said upgrade policy, unless said software upgrade request has been denied by said portable electronic device for not complying with said upgrade policy.

* * * * *